Jan. 27, 1970  D. P. SHILEY  3,491,376
HEART VALVE WITH SEPARATE SUTURING RING SUB-ASSEMBLY
Filed Oct. 6, 1965  5 Sheets-Sheet 1
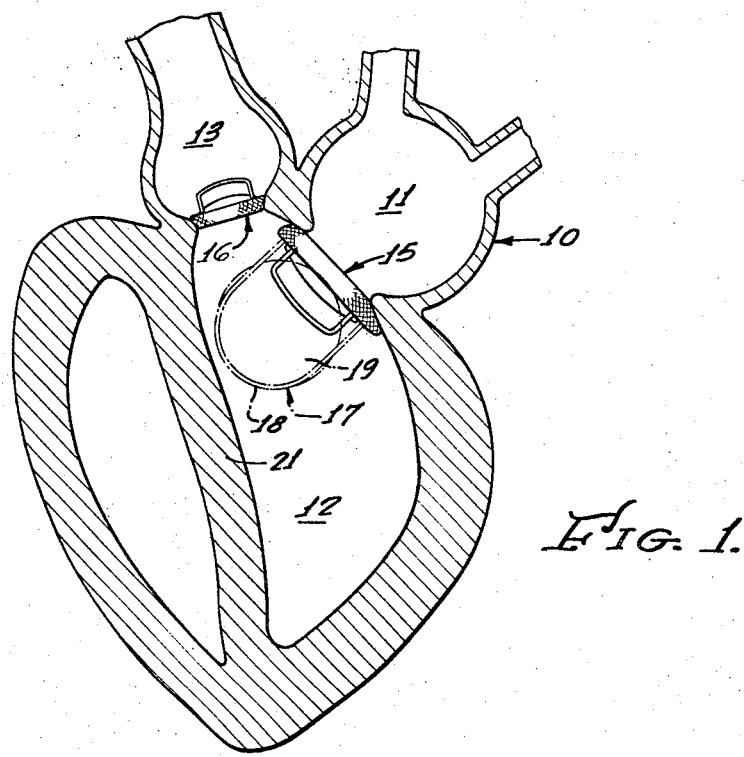
FIG. 1.
PRIOR ART
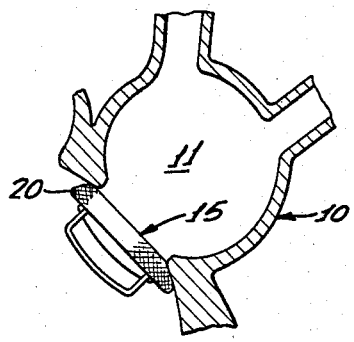 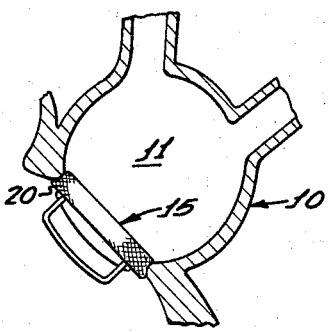 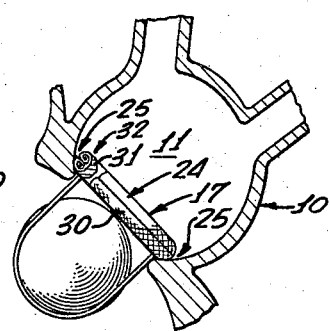
FIG. 2a.  FIG. 2b.  FIG. 2c.
INVENTOR.
DONALD P. SHILEY
BY FOWLER, KNOBBE
& GAMBRELL
ATTORNEYS.

Jan. 27, 1970     D. P. SHILEY     3,491,376
HEART VALVE WITH SEPARATE SUTURING RING SUB-ASSEMBLY
Filed Oct. 6, 1965                                   5 Sheets-Sheet 2
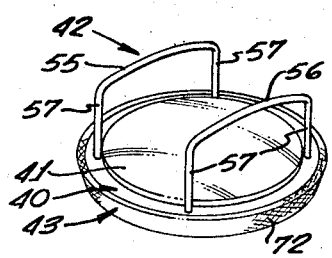
Fig. 3.
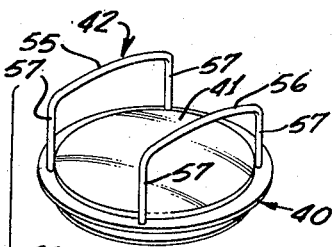
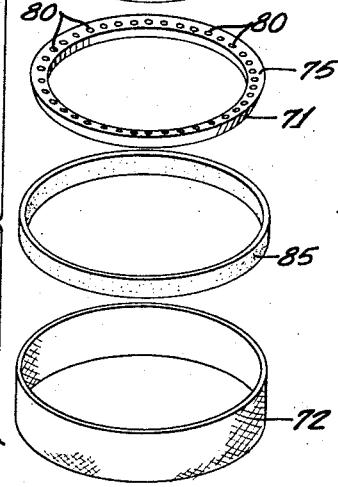
Fig. 4a.
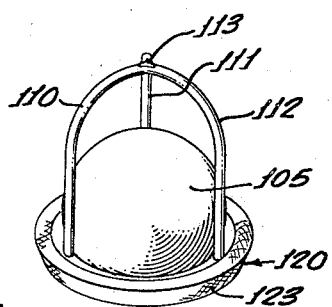
Fig. 4b.
Fig. 9.
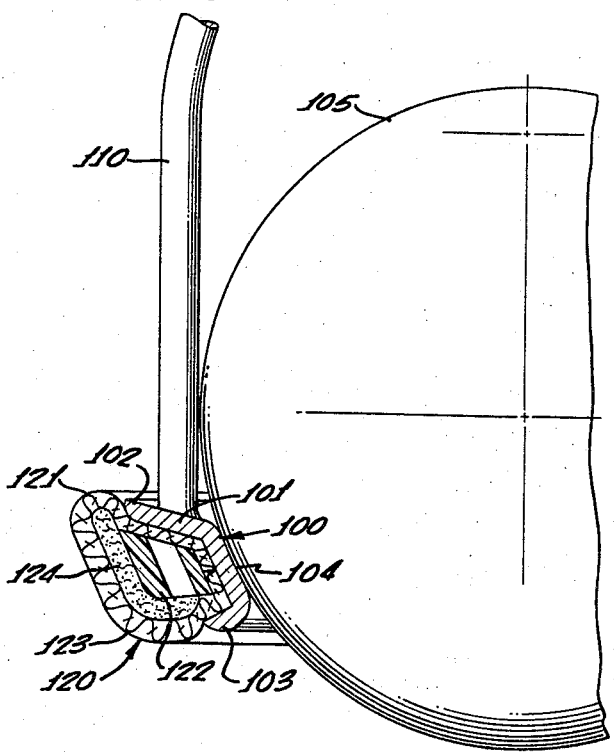
Fig. 7.
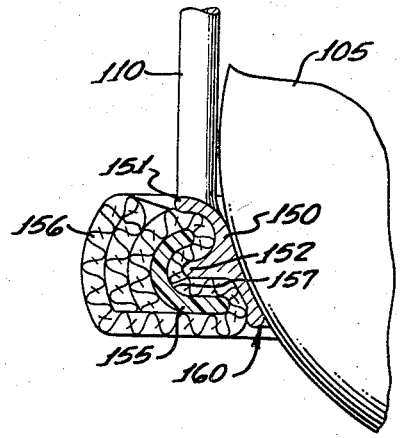
Fig. 8.
INVENTOR.
DONALD P. SHILEY
BY FOWLER, KNOBBE
& GAMBRELL
ATTORNEYS.

Jan. 27, 1970  D. P. SHILEY  3,491,376
HEART VALVE WITH SEPARATE SUTURING RING SUB-ASSEMBLY
Filed Oct. 6, 1965  5 Sheets-Sheet 3

INVENTOR.
DONALD P. SHILEY
BY FOWLER, KNOBBE
& GAMBRELL
ATTORNEYS.

INVENTOR.
DONALD P. SHILEY
BY FOWLER, KNOBBE
& GAMBRELL
ATTORNEYS.

United States Patent Office 3,491,376
Patented Jan. 27, 1970

3,491,376
HEART VALVE WITH SEPARATE SUTURING RING SUB-ASSEMBLY
Donald P. Shiley, 11022 Huntinghorn,
Santa Ana, Calif. 92705
Filed Oct. 6, 1965, Ser. No. 493,326
Int. Cl. A61f 1/22
U.S. Cl. 3—1                                    29 Claims

ABSTRACT OF THE DISCLOSURE

A prosthetic heart valve having a suture ring constructed as an integral sub-assembly which is easily attached to the valve body. In one embodiment, the movable valve member is disc-shaped and is retained within a cage structure provided by two parallel, non-intersecting bars limiting the axial movement of the disc with respect to the valve seat so that the disc cannot fall into the valve aperture.

---

The present invention relates to improvements in heart valves and more particularly to valves for use as prosthetic valvular replacements.

The preferred configuration of this invention comprises a novel disc valve providing a large diameter orifice size while maintaining a cage structure of minimal volume. Heart valves so constructed may be utilized to advantage as prosthetic replacements for the mitral, aortic and tricuspid heart valves. The minimal dimension of the valve along an axis perpendicular to the valve disc more closely approximates the dimensions of the natural heart valves, thereby permitting prosthetic replacements where it has previously been quite difficult and sometimes considered impossible to utilize a ball type valve. In other applications, the decreased size of the valve provides an added factor of safety for the patient. By way of example, when the valve of this invention is used as a prosthetic replacement in the mitral valve area, it does not obstruct the outflow passage to the aortic valve and further substantially reduces the possibility of damage to the ventricular septum by the cage structure.

Another significant feature of the invention is the provision of a suture attachment means which occupies a very small volume, thereby minimizing the foreign material within the heart and providing a maximum orifice size for the prosthetic replacement. Moreover, although the suture attachment means of this invention occupies a very small volume, it readily conforms to the contour of the area of the heart in which the valve is placed. This latter feature both greatly facilitates attaching the prosthetic valves to the heart tissue and makes it substantially easier to effect a seal between the exterior of the prosthetic valve and the wall of the heart tissue to which it is attached.

Still another feature of the suture attachment means of this invention is that it enables a surgeon to provide a mitral prosthetic replacement without placing any foreign material within the left atrium. A significant advantage thereof is that the prosthetic structure does not develop any cul-de-sac areas of low blood velocity within the atrium chamber, thereby eliminating a primary cause of thrombus formation. Another advantage derived from locating the prosthetic valve entirely without the atrium is that the pressure gradient between the ventricle and atrium tends to seal the fastening means to the heart tissue.

A further feature of the suture attachment means of this invention is that it minimizes the exposed metal area and moreover permits the surgeon to locate what metal is exposed in a well-washed region of the heart so as to remove still another cause of clot formation.

Another feature of this invention is that it greatly facilitates the manufacture of heart valves by constructing the suture ring as an integral sub-assembly which is simply snapped on to the heart valve body. Thus, the suture attachment means may be completely inspected prior to final assembly. In this manner, it is possible with the present invention to maintain consistent quality control over the manufacture of the heart valve whereas certain of the prior art assembly techniques make it exceedingly difficult if not impossible to exercise the same precise control over the manufacturing process. For example, one step utilized in the manufacture of certain of the prior art valves is that of winding a number of turns of wire or resin thread to bind the suture ring to the valve body. Such a step is undesirable, not only because of the additional time required to construct each heart valve, but, most importantly, because it is not possible to inspect a unit and determine whether the assembler inadvertently overstressed the wire or thread. Such an occurrence is not uncommon, particularly during the final twisting of the wire or thread pigtails.

These and other features and advantages of the invention will become apparent as the description proceeds.

Briefly, in accordance with the preferred embodiment of the present invention, a prosthetic heart valve comprises a valve member forming a circular valve port and a disc-shaped movable valve member for sealing engagement with the valve port. The valve member includes two oppositely disposed generally U-shaped rods attached to an annular base. The distance between the legs of each of these rods is less than the diameter of the disc so as to provide a cage structure for the disc. The length of the legs is such that the generally frusto-conically shaped fluid discharge opening formed by the disc in its opened condition is approximately 115% of the area of the valve orifice. This configuration provides a disc valve having a very short overall dimension along an axis vertical to the disc so that the prosthesis may occupy a minimal volume within the heart while maintaining a minimum pressure gradient across the valve.

The suture attachment means constructed in accordance with this invention comprises a generally annular shaped member formed of a resilient material, an annular pad, and a cloth secured around substantially the entire surface of such resilient member. This sub-assembly and the valve body are so formed that at least a portion of the resilient annular member has a smaller internal radius than the radius of at least a portion of the exterior surface of the valve member. In this manner, the suture ring sub-assembly is permanently secured to the valve body member by temporarily deforming the annular member so as to snap the interior portion of lesser diameter of the annular member into juxtaposition with the exterior portion of larger diameter of the valve body member.

Advantageously, the resilient annular member is preformed to a frusto-conical configuration to facilitate attachment of the prosthetic valve within the heart. In addition, an annular pad is advantageously placed between a portion of the annular member and the cloth cover so that the suture ring is more resilient. In this manner, the valvular prosthetic readily conforms to the shape of the area within the heart to which it is attached and greatly facilitates the attachment of heart valves in the aortic, mitral and tricuspid locations.

As described in detail hereinafter, in the preferred embodiments of the suture attachment means, the cloth is attached to the suture ring so that the cloth ends are joined along an internal peripheral surface of the ring which is entirely concealed when the suture ring sub-assembly is secured to the valve body. In this way, the exposed portion of the suture ring advantageously comprises a flawless, smooth, uninterrupted cloth surface.

A more thorough understanding of the invention may be obtained by a study of the following detailed description, taken in connection with the accompanying drawings in which:

FIG. 1 is a diagrammatic cross-sectional view of a human heart prosthesis illustrating the positioning of the heart valves of this invention as both mitral and aortic valvular replacements;

FIGS. 2a and 2b illustrate preferred locations for the mitral valve prosthesis;

FIG. 2c illustrates a prior art ball valve used as a mitral valve prosthesis;

FIG. 3 is a perspective view of a completed heart valve constructed in accordance with the present invention;

FIG. 4a is an exploded view showing the structural members which form the completed heart valve of FIG. 3;

FIG. 4b is a perspective view of a completed suture ring sub-assembly;

FIG. 7 is an enlarged fragmentary sectional view of a ball and seat check valve having a suture attachment means constructed in accordance with this invention;

FIG. 8 is an enlarged fragmentary sectional view of an alternative embodiment of the invention;

FIG. 9 is a perspective view of a ball and seat heart valve of FIG. 7;

FIG. 10 is an enlarged sectional view illustrating the manner in which the suture attachment means of this invention conforms to the wall of the left ventricle in the position shown in FIG. 2a;

Figure 6:
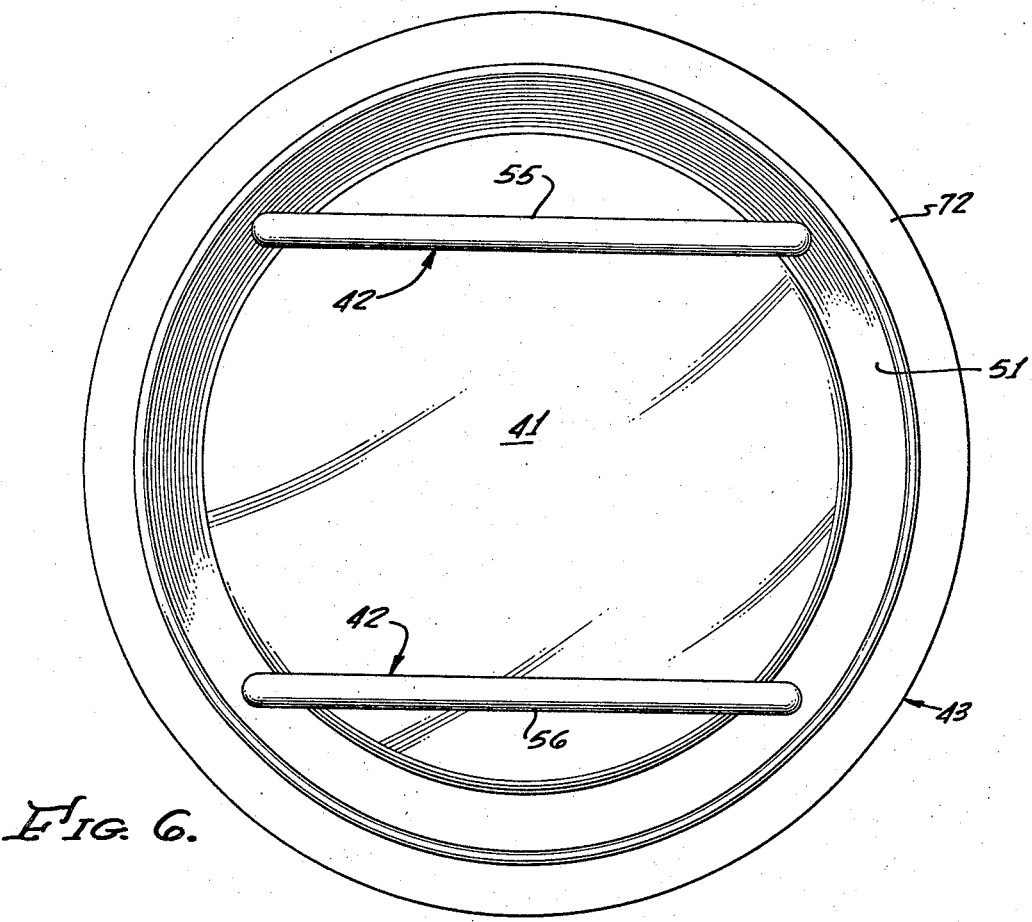
FIG. 6 is a plan view of the heart valve shown in FIGS. 3 and 5.

Referring now to FIG. 1, the human heart 10 is depicted having a left atrium 11, a left ventricle 12, and the aorta artery 13 which communicates with the left ventricle 12. For purposes of illustration, both mitral and aortic valvular prostheses are shown in location so as to illustrate the relative size of the two types of valve configurations. Thus, a mitral disc valve 15 is located in the opening between the left atrium and left ventricle and an aortic disc valve 16 is located in the opening between the aorta and left ventricle.

FIG. 1 further shows the relative difference in physical sizes between a ball type valve 17 and the disc valve 15. It will be seen that in order to provide a given orifice size, the ball type valve must necessarily occupy a substantially greater volume than the disc valve. The larger physical configuration of the ball valve is undesirable since the cage structure 18 and the ball 19 obstruct the flow passage leading to the aortic valve and the aorta artery 13, thereby tending to increase the pressure gradient between the left ventricle and the aorta. Further, there is danger that the cage structure 18 will contact and damage the ventricular septum 21. A further disadvantage of the ball valve is that the mass of the ball 19 is greater than the mass of the disc of the disc valve so that a greater force is required to open and close the ball valve than a disc valve of like aperture size. This additional force is undesirable as it tends to elevate the left atrium pressure.

The prosthetic disc valves described herein may also replace the tricuspid valve (not shown) between the right atrium and right ventricle. In particular, the small physical volume of the disc valves of this invention permit prosthetic replacements in this area where it has been previously difficult and sometimes considered impossible to utilize a ball type valve.

The pumping action of the heart is such that when the blood within the left ventricle 12 is pumped into the aorta artery 13, the mitral valve 15 automatically closes and the aortic valve 16 automatically opens. Likewise, when the left ventricle 12 receives blood from the left atrium 11, the aortic valve 16 automatically closes and the mitral valve 15 automatically opens.

The precise manner in which the valve is positioned within the heart is determined by the surgeon. Three different locations for the mitral area are respectively shown in FIGS. 2a, 2b and 2c. Of these, the locations of FIGS. 2a and 2b are preferred whereas the location of FIG. 2c is considered undesirable as it tends to encourage thrombus formation within the left atrium. In FIG. 2a the prosthetic mitral valve 15 and its suture attachment means 20 are located substantially within the left ventricle 12 with no foreign material being located in the left atrium 11. In the location of FIG. 2b, the valve 15 and its associated suture attachment means 20 are located in the passage between the left atrium and left ventricle and attached to the root tissue of the natural mitral leaflets.

A significant advantage of this invention is that, as described hereinafter, the suture attachment means is particularly adapted for locating the valve in the position of FIGS. 2a and 2b.

In contrast, in the location of FIG. 2c, the suture attachment ring 24 of the prior art ball valve lies within the confines of the left atrium thus forming a cul-de-sac 25 around the entire circumference of the suture ring between the ring 24 and the base of the interior wall of the left atrium. The blood velocity is lowered in this cul-de-sac area which encourages thrombus formation within the left atrium, an area of the heart which is particularly prone to clotting. A further reason that the prosthetic heart valve is not satisfactorily mounted in the position of FIG. 2c is that the exposed metal 31 of the prior art valve body forms an unsteady tissue margin away from a high velocity blood flow. Thus, scar tissue grows into the cloth cover 30 of the suture ring 24 followed by the growth of an endothelium covering. Such cover, however, terminates when it comes to the exposed metal portion of the body member 31. This margin between the metal and the endothelium lining is unsteady and is moreover located in an area 32 away from high velocity blood flow. As a result, small bits of tissue tend to break off and become nidi for clot accretion. In contrast, the heart valve prostheses of this invention are particularly adapted for use in the prosthesis locations of FIGS. 2a and 2b which do not form cul-de-sac areas within the left atrium. Further, the valve structures of this invention advantageously provide a minimal area of exposed metal and locate the exposed metal in a flow of high velocity blood. In this manner, the exposed area is continually thoroughly washed with blood effectively discouraging thrombus formation.

Figure 5:
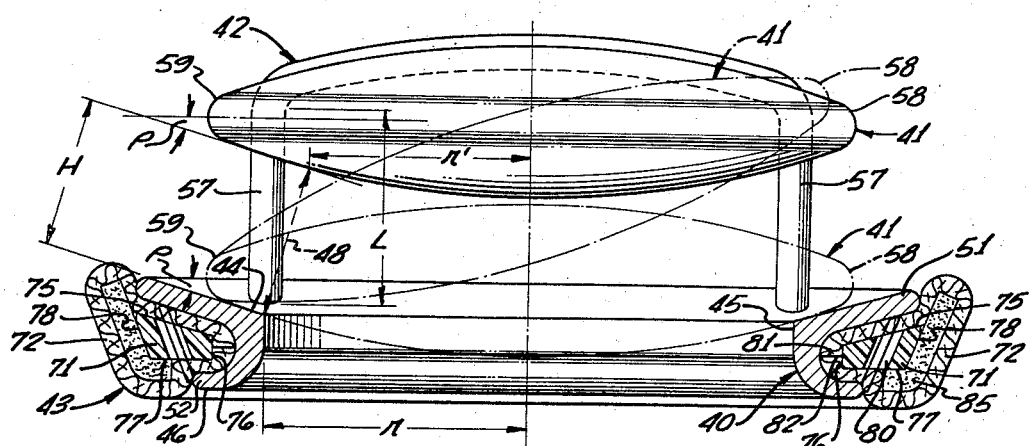
FIG. 5 is an enlarged sectional view of the preferred embodiment of the invention of FIG. 3.

A preferred embodiment of a disc heart valve constructed in accordance with this invention is illustrated in FIGS. 3, 5 and 6 and comprises an annular body 40, a movable valve disc 41, a disc retaining cage structure 42, and a suture attachment ring 43.

The annular body member 40 forms an integral valve seat 44 forming an angle $\rho$ with respect to the horizontal plane of the orifice 45 corresponding to the angle $\rho$ formed by the slope of the bottom face of the disc with respect to a horizontal plane therethrough. The circular orifice 45 has a radius $r$ and communicates the valve seat 44 with the bottom face 46 of the body 40. The body 40 further comprises an upper radially extending annular projection 51 and a lower radially extending annular projection 52.

The cage structure 42 comprises two generally U-shaped rods forming a pair of parallel bars 55, 56 retained above the disc by integral legs 57 respectively extending from the ends of each of the bars to the valve body. The distance between the legs 57 of each of these rods is less than the diameter of the disc so as to provide a cage structure for the disc 41. Advantageously, the legs are located quite close to the edge of the disc with a few thousandths inch tolerance between the edge of the disc and the interior surfaces of the rods. The U-shaped configuration of the rods provides a rigid structure thus permitting these rods to be constructed of very small diameter wire, a representative dimension being wire .042" in diameter. A further advantage of this structure is that the U-shaped members are independent, self-supporting structures with no cage members crossing or contacting one another, thereby removing another possible source of clot formation.

A significant feature of the present invention is that the length L of the legs is maintained very short so as to provide a valve having a very short overall dimension along an axis vertical to the disc. This is possible since applicant has discovered that if the fluid discharge area formed between the bottom of the disc 41 and the valve seat 44 when the valve is in its open condition is at least approximately 115% of the area of the orifice 45, the pressure gradient across the valve will be the same regardless of how much longer the legs 57 are made. Relating this to the specific embodiment of FIG. 5, the lateral area defined by a frusto-conical fluid discharge surface area 48 extending between the inner edge of the valve seat 44 and the lower edge of the disc 41 should be at least approximately 115% of the orifice area or $\pi H(r+r')$ should be at least 115% of $\pi r^2$ where $r$ is the radius of the orifice, H is the height of the lateral surface 48 and $r'$ equals $(r - H \sin \rho)$. Extending the length L of the legs so as to increase this frusto-conical fluid discharge area will not achieve a lower pressure gradient across the valve in its open condition but will only serve to adversely increase the physical size of the valve.

A further advantage derived from limiting the extent of the legs 57 of the disc valve cage 42 is that it positively limits the axial movement of the disc with respect to the valve body 40. It has been found that it is important to limit the axial movement of the disc such that if one edge thereof is positioned a maximum disance away from the valve seat, the opposite portion of the disc cannot extend to within the orifice 45. Thus, as shown by the dashed lines in FIG. 5, when one edge 58 of disc 41 engages the upper portions of the rods 55, 56, the opposite edge 59 engages the valve seat 44 and cannot fall beyond the seat into the aperture area 45.

By way of specific example, the annular body 40 and cage structure 42 are advantageously formed of a cobalt base metal known in the art as Stellite #21 or Vitalium and the exterior cloth surface of the suture attachment ring 43 is formed from a woven cloth of material known in the art as Teflon. The disc 41 is advantageously formed of a silicone rubber known in the art as Silastic by well known procedures including molding using heat and pressure and heat treating after vulcanizing to drive off the vulcanizing catalyst to increase the Shore hardness to the 55–60 range.

The suture attachment means of this invention as used in conjunction with the disc valve described hereinabove are shown in FIGS. 3, 4a, 4b and 5. As is apparent from FIG. 3, one advantage of this embodiment is that the suture attachment ring 43 occupies a substantially smaller volume than the prior art suture rings. Moreover, the suture ring 43 provides a uniform continuous cloth surface having a frusto-conical configuration as shown.

The suture ring 43 is formed as an integral sub-assembly 70 (FIG. 4b) and comprises an annular shaped member 71 formed of a resilient material and a cloth 72 secured around substantially the entire exterior surface of the member 71. In the preferred embodiment, the annular member 71 is provided with a top surface 75, an inner surface 76 and a bottom surface 77 shaped to conform to the space formed by the annular body member 40 and its projections 51, 52. The outer face 78 of the annular member is shaped to provide a frusto-conical surface. The entire surface of the annular member 71 is covered with the cloth 72 advantageously formed as an annular band having a sufficient circumference to extend around the outer face 78 of member 71 and a sufficient width to cover the surface of member 71 and an annular cloth pad 85. The resilient annulus 71 is provided with a plurality of holes 80 extending between the top and bottom surfaces and the cloth band is attached to the annulus by passing a thread through the holes in the retainer ring and attaching both sides of the cloth 72 tightly against the sides of the annulus 71. The retainer ring 71 is preferably provided with an odd number of holes 80. The cloth band 72 is then sewn to the retainer ring by passing the thread through the holes in the retainer ring and catching both sides of the cloth band tight against the sides of the retainer ring. The stitching goes one way through the cloth material laid on the upper surface of the retainer ring, through a hole and out through the cloth laid on the lower surface, then through this same layer of cloth into an adjacent hole until all of the holes have been used. The sewing is then continued a second time around, causing the stitches to pass through each of the holes twice in respectively opposite directions. The thread used in the stitching is started and terminated with a weaving stitch.

The edges 81 and 82 of the cloth band 72 are advantageously dressed with an adhesive and abutted together. The cloth band is so arranged on the retainer ring that the abutted edges terminate away from the outer face 78 of the annulus and are thus concealed between the inside diameter 76 of the retainer ring and the annular housing 40 as shown. In this manner, the outer surface of the suture attachment ring 43 comprises an entirely smooth uninterrupted cloth-covered member as shown in FIG. 3.

In order to slightly increase the radial dimension of the sewing ring 43 in order to increase its volume and resiliency, an annular cloth pad 85 is advantageously placed between the cloth 72 and the annulus 71 prior to sewing the cloth.

By way of specific example, the cloth band 72 is formed from a tricot woven Teflon material. The thread used to attach the cloth to the annular resilient retainer member 71 is also advantageously formed of Teflon. The resilient annular retainer member 71 is advantageously formed of nylon and machined to a dimension some 2% smaller than the desired configuration. Prior to assembling the sub-assembly 70, the ring is boiled in water for an extended time, e.g. five hours, to bring the ring up to 100% moisture content. Since the nylon material expands some 2% when it is brought up to 100% moisture content, this step obviates expansion of the ring when it is located in an area of the heart in continuous contact with body fluids. Expansion of the ring when so located would of course be undesirable as it would tend to loosen the fit between the suture ring and the annular body 40.

The entire suture atachment sub-assembly 70 is attached to the valve body 40 by snapping the sub-assembly between the projections 51, 52 of annular body 40 as shown in FIGS. 4 and 5. By virtue of the fact that a portion of the annular member has a smaller interior diameter than the diameter of the projections 51, 52, it will be seen that the resilient annular member 71 can be secured in juxtaposition with the projections 51, 52 when the annulus is temporarily deformed to pass over the larger diameter portion of the body 40. The body 40 and retainer member 71 are so sized that the distances between the outer surfaces of the body member and the juxtaposed surfaces 75, 76 and 77 of the retainer member are equal to or slightly less than the thickness of the cloth cover 72. The cloth 72 will then compress slightly when the sub-assembly is snapped in place and provide a tight fit between the sub-assembly 70 and the body member 40.

The suture attachment means of this invention is illustrated in FIGS. 7 and 9 in conjunction with a ball type valve. As shown, the ball valve includes a body 100 comprising an annular member 101 having an upper radially extending projection 102 and a lower radially extending projection 103. The inner peripheral wall 104 of the body 100 is shaped to provide a seat for the movable ball valve member 105. A cage structure comprises three vertically extending rods 110, 111, 112 curving inwardly away from the annular member 101 and joined together at point 113.

A suture attachment means 120 comprises a sub-assembly 121 formed by an annular shaped member 122 formed of a resilient material and a cloth cover 123 secured around substantially the entire exterior surface of the member 122. As described above in conjunction with FIGS. 4, 5, the annular member 122 is provided with an upper surface, an inner surface, and a bottom surface shaped to conform to the annular member 101 and its projections 102 and 103. The resilient annulus 122, the cloth cover 123 and an inner pad 124 are sewed together to form a sub-assembly 121 which when snapped onto the body member provides a suture ring comprising an entirely smooth, uninterrupted cloth covered member.

The procedure for forming a suture attachment sub-assembly and securing this sub-assembly to the valve housing as described above offers a number of advantages over prior art structures and procedures. These include the fact that only two machined or molded pieces, i.e., the valve body and the resilient retainer ring govern tightness of retention of the suture ring to the valve body. Further, the entire suture ring sub-assembly is subject to careful inspection before final assembly. A further advantage is that although the suture ring occupies a very small volume, it readily conforms to the contour of the area of the heart in which the prosthesis is located. This feature may be more easily understood by reference to FIGS. 10, 11 and 12.

Figure 10:
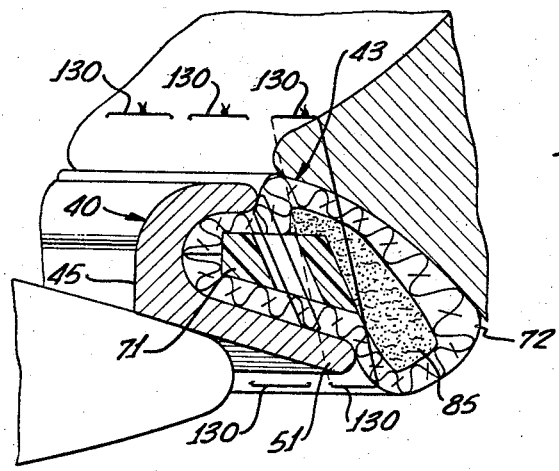

FIG. 10 is an enlarged view of a heart valve mounted in the mitral area entirely within the left ventricle as previously shown in FIG. 2a. It will be seen that the outer surface of the sewing ring 43 has been deformed to follow the arcuate contour of the wall of the left ventricle proximate the opening to the left atrium. Although of small physical volume, the sewing ring readily flexes along its outer wall to provide an extended surface of material for attaching to the heart tissue by means of a series of sutures 130.

Figure 11:
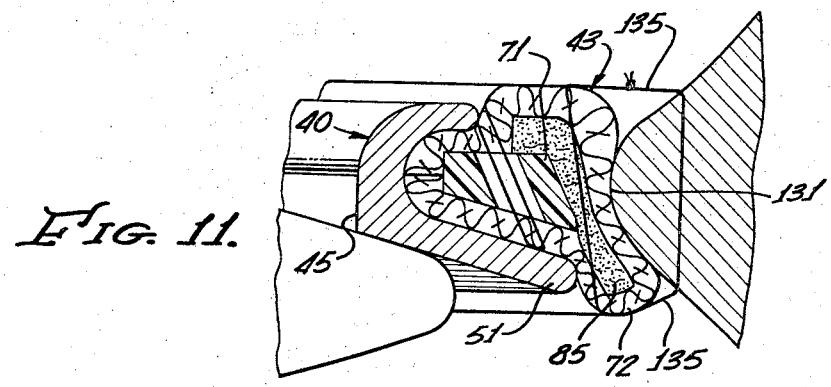
FIG. 11 is an enlarged sectional view showing the manner in which the suture attachment means conforms to the cylindrical heart tissue at the root of the mitral leaflets in the position shown in FIG. 2b.

In FIG. 11, wherein the valve is atached to the root of the mitral leaflets in the opening between the left ventricle and the left atrium, the suture attachment ring 43 has undergone a deformation so as to conform to the generally cylindrical ring of heart tissue located at the root of the natural mitral leaflets. As shown, an inwardly formed annular depression 131 is readily assumed by the sewing ring 43 so as to lie in direct abutment with the heart tissue. In this configuration also there is ample material for attaching the valve to the heart tissue by sutures 135.

Figure 12:
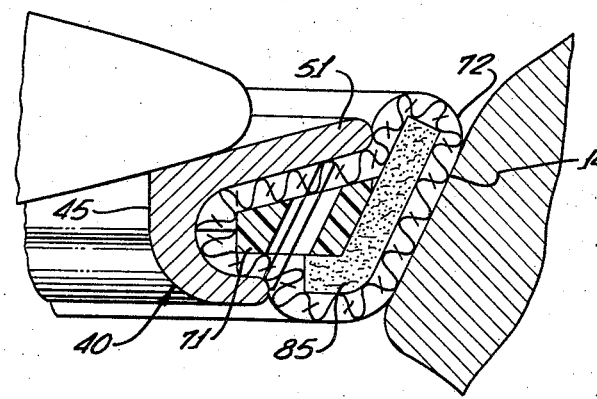
FIG. 12 is an enlarged sectional view showing the manner in which the suture attachment means of this invention conforms to the wall of the aortic root in the position shown in FIG. 1.

FIG. 12 is an enlarged view of the heart valve placed in the aortic area. As shown, the frusto-conical configuration of the sewing ring as manufactured closely conforms to the flair of the aortic root 140, thus substantially facilitating attaching of the heart valve in this area.

In all of the foregoing embodiments, it will be seen that although the radial extent of the suture ring is quite small, it yet provides a highly flexible ring adapted to conform to the three quite different tissue configurations shown in FIGS. 10, 11 and 12. This small radial extent of the suture attachment means permits the maximum aperture valve to be used for a given valvular replacement thereby most closely approximating the nautral heart valve and reducing the pressure gradient across the prosthetic valve in its open condition. A concomitant advantage of the flexible suture ring is that it immediately forms an excellent hydraulic seal between the wall of the ring and the heart tissue, thereby making it substantially easier for the surgeon to attach the valve in the selected area without incurring any leaks between the exterior of the sewing ring and the surrounding heart tissue.

An alternative embodiment for the suture ring of a ball type valve is shown in FIG. 8 and comprises an annular body member 150 having an upper radially extending annular projection 151 and a lower annular radially extending projection 152, spaced between the upper and lower edges of the member 150. The suture ring sub-assembly comprises a resilient annular retainer member 155 having a generally U-shaped cross-sectional configuration forming an inwardly facing annular groove 157 and a cloth cover 156. In this embodiment, the cloth cover is folded and sewn to provide a multiple thickness of cloth to increase the radial extent of the suture ring. This sub-assembly is attached to the annular body member 150 in the manner described hereinabove wherein the resilient retainer member 155 is temporarily deformed to extend over the larger diameter projection 152. Since the projection 152 has a larger diameter than both the upper and lower edges of the retainer member 155, the suture assembly will be secured in place without any thread or wire binding around the body member.

Figure 13:
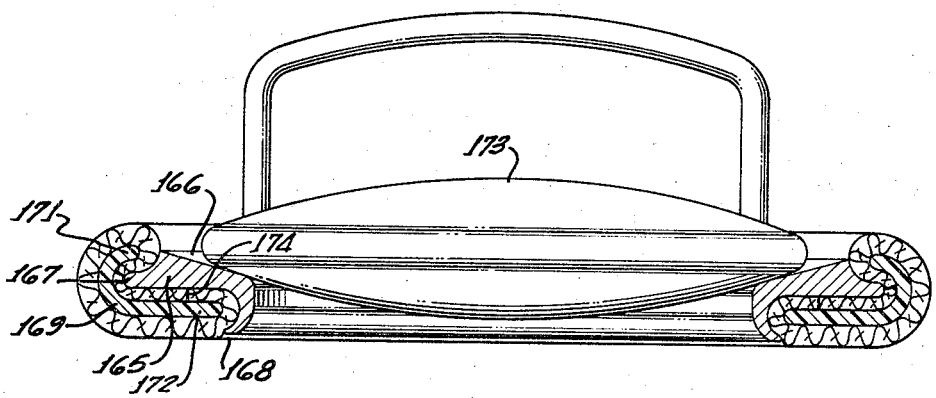
FIG. 13 is an enlarged sectional view of an alternative embodiment of the present invention particularly adapted for use as a mitral valve prosthesis.

FIG. 13 is a sectional view of still another embodiment of the present invention. This valve is designed for use as a mitral prosthesis and includes a suture ring having a substantial radial extent which is used to best advantage for attaching the heart valve within the left ventricle at the opening of the left atrium. As shown, this embodiment comprises a body member formed as a relatively thin member 165 providing a seat 166 for the valve disc 173. Member 165 includes a first radially extending annular projection 167 spaced between the upper and lower edges thereof and another radially extending annular projection 168 at the lower edge thereof. The suture sub-assembly comprises a cloth covered annular resilient retainer member 169 having a generally J cross-sectional configuration with the shorter leg 171 of the J forming the upper surface of the retainer member and the longer leg 172 of the J forming the lower surface of the retainer member. The first radially extending annular projection 167 has a larger diameter than either of the legs 171, 172 of the retainer member so that when the retainer member is temporarily deformed, it snaps the first projection 167 between the respective legs 171, 172 of the J configuration retainer member and the longer leg 172 of the J lies between the first and second projections 167, 168 of the body member to secure the suture attachment sub-assembly to the body member. Advantageously, the seam 174 formed by the ends of the cloth is located between the member 169 and the body member 165 so as to present a continuous smooth cover as the exterior surface of the suture ring.

Figures 14, 15:
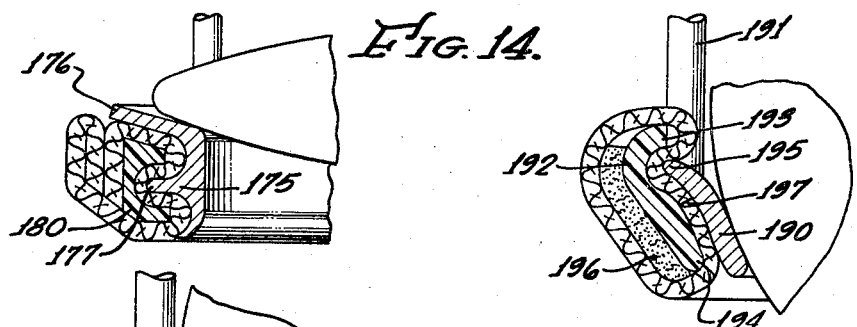
FIG. 14 is an enlarged fragmentary sectional view of an alternative embodiment of the present invention.
FIGS. 15 and 16 are fragmentary sectional views of additional embodiments of the present invention particularly adapted as mitral valve prostheses.

FIG. 14 is a modified form of the invention shown in FIG. 8 for use in conjuntion with a disc valve member and comprises an annular body member 175 having a first radially extending projection 176 and a mid-spaced radially extending projection 177. The generally U-shaped retainer member 180 is covered with a cloth folded to multiple thickness and sewn to increase the radial extent of the suture ring in the manner of the embodiment of FIG. 8.

FIG. 15 illustrates still another modification of the sewing ring of the invention shown in conjunction with a ball type mitral valve. As shown, the annular body member 190 has a generally frusto-conical cross-sectional configuration with the cage structure 191 being attached to the widest diameter portion of the body. A resilient annular retainer member 192 is formed with a generally J cross-sectional configuration having a short leg 193 and a longer leg 194, each of which extends within the area defined by the outermost portion 195 of the body 190. An annular pad 196 is located along a portion of the outside surface of the resilient member 192 and this pad and the resilient member are covered with a continuous cloth cover. The edges of the cloth are advantageously sewn together to provide a seam 197 concealed between the annular resilient member 192 and the annular body member 190 to present a smooth continuous cloth surface.

Figure 16:
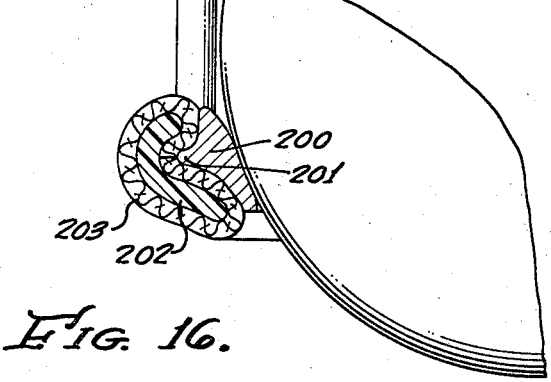

A further embodiment of the sewing ring in conjunction with a ball type mitral valve is shown in FIG. 16 comprising a body member 200 formed with a frusto-conical cross-section and further having a mid-spaced projection 201. A resilient annular member 202 covered with a cloth band cover 203 is adapted to snap over the projection 201 as shown.

I claim:

1. In a heart valve prosthesis,
    an annular body member forming a check valve and having a first radially extending annular projection and a second spaced radially extending annular projection, and
    a suture attachment sub-assembly for attaching said body member to heart tissue comprising
        a generally annular shaped retainer member formed of a resilient material and having a plurality of spaced holes extending between the upper and lower surfaces thereof and an annular cloth band secured to the exterior surface of said retainer member by a thread passed through the portions of the band laid against said upper and lower surfaces of said retainer member and through the holes in the retainer member so that the edges of the cloth band abut one another on the inside diameter of said annular retainer member,
        the inner diameter of the annular retainer member of said suture attachment sub-assembly being less than the outer diameter of said first and second annular projections of said annular body member so that said suture ring sub-assembly is attached to said body member by temporarily deforming said resilient annular member to snap the interior portion of said annular member into juxtaposition between the first and second projections of said body member.

2. The heart valve prosthesis as described in claim 1 wherein:
    the outer diameter of said resilient retainer member is shaped to provide a frusto-conical surface so that the exterior surface of the suture ring sub-assembly is a like frusto-conical configuration.

3. The heart valve prosthesis as described in claim 1 wherein:
    said resilient annular retainer member is provided with an odd number of holes between the upper and lower surfaces thereof, said thread being passed through said holes a second time with said stitches passing through each hole twice in respectively opposite directions.

4. A heart valve prosthesis as described in claim 1 comprising
    an additional cloth pad retained between the outer diameter of said annular retainer member and said annular cloth band to increase the volume and resilience of said suture attachment sub-assembly.

5. A heart valve prosthesis comprising
    a body member forming a check valve and
    a suture attachment sub-assembly for attaching said body member to the heart tissue including
        a one-piece endless annular retainer member formed of a resilient material and a cloth covering secured around substantially the entire exterior surface of said annular resilient member, at least a portion of said annular retainer member having a smaller inner diameter than the outer diameter of at least a portion of the exterior surface of said body member so that said annular member is fixedly secured to said body member by temporarily deforming the resilient annular member to snap the interior portion of smaller diameter of the annular member into juxtaposition with the exterior portion of larger diameter of the body member.

6. The heart valve prosthesis as described in claim 5 wherein:
    said body member includes a first radially extending annular projection at its upper edge and a second radially extending annular projection at its lower edge, said resilient annular retainer member having an inner diameter less than the outer diameter of said projections so that said retainer member is snapped into juxtaposition between said projections to secure the suture attachment sub-assembly to the valve body.

7. The heart valve prosthesis as described in claim 5 wherein:
    said valve body includes a first radially extending annular projection at its upper edge and a second radially extending annular projection spaced between the upper and lower edges of the body member, said annular retainer member having a generally U-shaped cross-sectional configuration forming an inwardly facing annular groove, the outer diameter of said second lower annular projection of said body member being greater than the inner diameter of said retainer member so that when said retainer member is temporarily deformed it snaps the lower projection of said body into the annular groove of said retainer member to secure said suture attachment sub-assembly to said body member.

8. The heart valve prosthesis as described in claim 5 wherein:
    said body member includes a first radially extending annular projection spaced between the upper and lower edges thereof and a second radially extending annular projection at the lower edge thereof, said annular resilient member having a generally J-shaped cross-sectional configuration with the shorter leg of said J forming the upper surface of said retainer member and the longer leg of said J forming the lower surface thereof, said first radially extending annular projection of said body member having a larger diameter than either leg of said retainer member so that when said retainer member is temporarily deformed, it snaps said first projection of said body member between the respective legs of said J configuration retainer member and the longer leg of said J between said first and second projections of said body member to secure said suture attachment sub-assembly to said body member.

9. A heart valve prosthesis in accordance with claim 5 wherein said retainer member includes a plurality of spaced holes therethrough and said cloth suture ring is secured to the retainer member by passing stitches through said holes and the cloth.

10. A heart valve prosthesis comprising:
a body member forming a check valve, said body member having a generally frustro-conical cross-sectional configuration;
a suture atachment sub-asembly for attaching said body member to heart tissue including:
    a generally annularly shaped retainer member formed of resilient material; and
    a cloth covering secured around substantially the entire exterior surface of said annular resilient member, said retainer member having a generally J-shaped cross-sectional configuration, the maximum outer diameter of said body member being larger than either leg of said retainer member so that when said retainer member is temporarily deformed it snaps over the maximum diameter portion of said body member between the respective legs of said J-configuration retainer member to secure said suture attachment sub-assembly to said body member.

11. A heart valve prosthesis comprising:
a body member forming a valve seat surounding an orifice,
a movable valve member for sealing engagement with said valve seat having a narrow cross-sectional configuration in a plane perpendicular thereto,
a cage structure connected to said body member for retaining said movable valve member, said cage structure limiting movement of said valve member away from said valve seat such that the area of the fluid discharge opening formed by the movable valve member in its open condition is approximately 115% of the area of said valve orifice, and
a suture atachment member for attaching said body member to heart tissue including a one-piece endless ring resilient retainer member formed of a resilient material and having an aperture therein corresponding to a portion of the outer surface of said body member, at least a portion of said retainer member having a smaller inner dimension than the outer dimension of at least a portion of the surface of said body member, so that said retainer member is fixedly secured to said body member by temporarily deforming the resilient member to snap the interior portion of lesser dimension of the resilient member into juxtaposition with the exterior portion of greater dimension of the body member.

12. A heart valve comprising:
a body member forming a circular valve seat surrounding a circular orifice, said body member having a first radially extending annular projection and a second spaced radially extending annular projection,
a disc-shaped movable valve member which sealingly engages said valve seat,
a disc retaining cage structure connected to said body member,
    said cage structure limiting movement of said disc away from said valve seat such that the area of the fluid discharge opening formed by the disc in its open condition is approximately 115% of the area of the valve orifice to provide a prosthesis having a minimum overall distance along an axis vertical to the orifice without decreasing the pressure gradient across the valve in its open condition and for preventing an edge of the disc from entering the space within said orifice, and a suture attachment sub-assembly for attaching said body member to heart tissue comprising
        a generally annular shaped retainer member formed of a resilient material and having a plurality of spaced holes extending between the upper and lower surfaces thereof and an annular cloth band secured to the exterior surface of said retainer member by a thread passed through the portions of the band laid against said upper and lower surfaces of said retainer member and through the holes in the retainer member, said cloth band being positioned on said retainer member so that the edges of the cloth band abut one another on the inside diameter of said annular retainer member,
    the inner diameter of the annular retainer member of said suture attachment sub-assembly being less than the outer diameter of said first and second annular projections of said annular body member so that said suture ring sub-assembly is permanently secured to said body member by temporarily deforming said resilient annular member to snap the interior portion of said annular member into juxtaposition between the first and second projections of said body member.

13. A heart valve prosthesis comprising:
an annular body member forming a check valve and having a generally frusto-conical cross-sectional configuration, said body member including a radially extending annular projection spaced between the upper and lower edges thereof;
a suture attachment sub-assembly for attaching said body member to the heart tissue including:
    a generally annularly shaped retainer member formed of a resilient material; and
a cloth covering secured around substantially the entire exterior surface of said annular resilient member, said annular resilient member having a generally J-shaped cross-sectional configuration, said radially extending annular projection of said body member having a larger diameter than either leg of said J-shaped retainer member so that when said retainer member is temporarily deformed it snaps said projection of said body member between the legs of said J-shaped retainer member to secure said suture attachment sub-assembly to said body member.

14. A heart valve prosthesis comprising
a body member forming a circular valve seat surrounding a circular orifice,
a disc-shaped movable valve member which sealingly engages said valve seat,
a pair of generally parallel, non-intersecting bars retained a fixed distance above said valve seat and a supporting leg extending from the ends of each of said bars closely juxtaposed the peripheral edge of said disc and with the distance between said bars being maintained less than the diameter of said disc, said bars and legs providing a rigid self-sustained cage structure for retaining said disc-shaped valve member relative to said valve seat and limiting movement of said disc-shaped valve member away from said valve seat while permitting the bars and legs of said structure to be constructed with small cross-sectional dimensions for minimizing the volume of the cage structure, and
means extending around at least a portion of the valve body for attaching said prosthesis to heart tissue.

15. A heart valve prosthesis comprising
a body member forming a circular valve seat surrounding a circular orifice,
a disc-shaped movable valve member which sealingly engages said valve seat,
a pair of generally parallel, non-intersecting bars retained a fixed distance above said valve seat and a supporting leg extending from the ends of each of said bars closely juxtaposed the peripheral edge of said disc and with the distance between said bars being maintained less than the diameter of said disc, said bars and legs providing a rigid self-sustained cage structure for retaining said disc-shaped valve member relative to said valve seat and limiting movement of said disc-shaped valve member away from said valve seat while permitting the bars and legs of said structure to be constructed with small cross-sectional dimensions for minimizing the volume of the cage structure, and a suture attachment sub-assembly for attaching said body member to the heart tissue including a generally annularly shaped deformable retainer member and a cloth suture ring secured to said retainer member, at least a portion of said annular retainer member having a smaller inner diameter than the outer diameter of at least a portion of the exterior surface of said body member so that said annular member with said suture ring attached is fixedly secured to said body member by temporarily deforming the resilient annular member to pass the portion of smaller diameter of the annular member over the exterior portion of larger diameter of the body member.

16. The method for manufacturing a heart valve prosthesis comprising the steps of attaching a cloth suture ring to a generally annular deformable retainer member to form a suture attachment sub-assembly, temporarily deforming said retainer member to enlarge its annulus, positioning said sub-assembly with its annulus enlarged onto the generally annular body member of the heart valve prosthesis, and reducing the diameter of the annulus of the retainer member to less than the diameter of a portion of the body member to retain said suture sub-assembly on said body member.

17. The method for manufacturing a heart valve prosthesis comprising the steps of attaching a cloth band to a generally annular resilient retainer member to form a suture attachment sub-assembly, temporarily deforming said resilient retainer member, and snapping said sub-assembly onto the generally annular body member of the heart valve prosthesis to permanently secure said suture attachment sub-assembly to said body member.

18. The method for manufacturing a heart valve prosthesis comprising the steps of attaching a cloth band to an annular resilient retainer member so that the edges of said cloth extend to the inner surface of said retainer member to form a suture attachment sub-assembly, temporarily deforming said resilient member, and snapping said sub-assembly onto the generally annular body of said heart valve prosthesis so that said edges of said cloth band are concealed between the sub-assembly and a surface of said body.

19. The method for manufacturing a heart valve prosthesis comprising the steps of attaching a cloth band to a retainer member having a plurality of spaced holes therein by passing a thread through a portion of said band lying on the upper surface of said retainer member, through a hole in said retainer member and through a portion of said band lying along the lower surface of said retainer member, temporarily deforming said resilient retainer member, and snapping said sub-assembly onto the generally annular body member of the heart valve prosthesis.

20. The method of manufacturing a heart valve prosthesis comprising the steps of attaching a cloth band to a retainer member having an odd number of spaced holes therein by passing a thread through a portion of said band lying on the upper surface of said retainer member, through a hole in said retainer member and through a portion of said band lying along the lower surface of said retainer member, and extending said thread around through said holes a second time so that said thread passes through each of said holes twice in respectively opposite directions to form a suture attachment sub-assembly, temporarily deforming said resilient retainer member, and snapping said sub-assembly onto the body of the heart valve prosthesis.

21. The method for manufacturing a heart valve prosthesis comprising the steps of attaching an annular cloth band to an annular resilient retainer member to form a suture ring sub-assembly, dressing the edges of said cloth band with an adhesive and abutting them together against the inside diameter of said retainer ring, and snapping said suture ring sub-assembly onto said body member so that said abutted edges are concealed between the suture ring and the valve body.

22. The method for manufacturing a heart valve prosthesis comprising the steps of placing a generally annular resilient retainer member in a boiling fluid until the material has attained approximately 100% of its maximum moisture content, attaching an annular cloth band to an annular resilient retainer member to form a suture attachment sub-assembly, and snapping said sub-assembly onto the body of the heart valve prosthesis.

23. In a heart valve prosthesis having a valve body forming a valve seat, a movable valve member which sealingly engages said valve seat, and a cage structure connected to said valve body for retaining said movable valve member, a suture attachment ring for attaching said valve body to the heart tissue which occupies a very small volume and which readily conforms to the contour of the area of the heart in which the prosthesis is located comprising a one-piece endless annular member formed of a resilient material and a cloth covering secured around substantially the entire exterior surface of said annular resilient member, at least a portion of said annular member having a smaller inner diameter than the outer diameter of at least a portion of the exterior surface of said body member so that said annular member is fixedly secured to said body member by temporarily deforming the resilient annular member to snap the interior portion of lesser diameter of the annular member into juxtaposition with the exterior portion of larger diameter of the body member.

24. A suture attachment ring for attaching a prosthetic member having a radially extending annular projection to body tissue comprising a one-piece endless annular member formed of a resilient material and a cloth covering secured around substantially the entire exterior surface of said annular resilient member, at least a portion of said annular member having a smaller inner diameter than the outer diameter of said projection of said prosthetic member so that said suture attachment ring is fixedly secured to said prosthetic member by temporarily deforming said annular resilient member to snap the inner portion of lesser diameter of the annular member into juxtaposition with the radially extending annular projection of said prosthetic member.

25. A heart valve prosthesis comprising a body member forming a check valve and a suture attachment member for attaching said body member to the heart tissue including a cloth pad extending substantially around a portion of said body member and an annular, endless one-piece retainer member for permanently securing said cloth pad to said body member, said retainer member being formed of a resilient material and having an aperture therein corresponding to a portion of the outer surface of said body member, at least a portion of said retainer member having a smaller inner dimension than the outer dimension of at least a portion of the surface of said body member, so that said retainer member is fixedly secured to said body member by temporarily deforming the resilient member to snap the interior portion of lesser dimension of the resilient member into juxtaposition with the exterior portion of greater dimension of the body member.

26. The method for manufacturing a heart valve prosthesis comprising the steps of:

providing an annular valve body member;

providing an annular one-piece endless resilient retainer member, at least a portion of said annular retainer member having a smaller inner diameter than the outer diameter of at least a portion of the exterior surface of said body member;

providing a cloth pad for mounting said prosthesis in the place of a defective natural heart valve;

placing a portion of said cloth pad intermediate the exterior surface of said body member and the interior surface of said retainer member; and resiliently expanding said retainer member radially and snapping said retainer member onto said body member to engage a portion of said cloth pad between an inside surface of said retainer member and an exterior surface of said body member.

27. A heart valve prosthesis comprising a first member defining a valve body;

a rigid cage extending over said body;

a valve closure member mounted within said cage;

a layer of cloth extending substantially around a portion of said first member;

a one-piece endless annular second member for permanently securing said layer of cloth to said first member, said second member having an aperture therein corresponding to a portion of the outer surface of said first member, at least a portion of said second member having a smaller inner dimension than the outer dimension of at least a portion of the surface of said first member;

one of said first or second members being formed of a resilient material so that said resilient member may be temporarily deformed to snap the interior portion of lesser dimension of the second member into juxtaposition with the exterior portion of greater dimension of said first member.

28. A heart valve prosthesis comprising a generally annular body member forming a check valve and having a first radially extending projection and a spaced second radially extending projection, an endless one-piece annular shaped resilient retainer member having a smaller inner diameter than the outer diameter of said first and second radially extending projections of said body member, said retainer member being mounted on said body member by resiliently expanding said retainer member and snapping said retainer member onto said body member, and a cloth covering secured to the exterior surface of said retainer member, the dimensions between the outer surfaces of said first and second radially extending projections of said body member and the juxtaposed surfaces of said retainer member being substantially equal to the thickness of said cloth covering so as to compress said cloth and provide a tight fit between the retainer member and said body member.

29. The method for manufacturing a heart valve prosthesis comprising the steps of attaching a cloth suture ring to an annular deformable retainer member having a plurality of spaced holes therein by passing a thread through said band and through the holes in said retainer member, temporarily deforming said retainer member to enlarge its annulus, placing said sub-assembly on the generally annular body member of the heart valve prosthesis, and reducing the diameter of the retainer member annulus to cooperate with a larger diameter portion of the valve body in holding the retainer member and cloth on the body.

References Cited

UNITED STATES PATENTS

| | | | |
|---|---|---|---|
| 1,160,707 | 11/1915 | Garber | 137—533.19 |
| 3,312,237 | 4/1967 | Mon et al. | 3—1 XR |
| 3,367,364 | 2/1968 | Cruz et al. | 3—1 XR |
| 3,263,239 | 8/1966 | Edwards et al. | 3—1 |
| 3,365,728 | 1/1968 | Edwards et al. | 3—1 |
| 3,371,352 | 3/1968 | Siposs et al. | 3—1 |
| 3,374,489 | 3/1968 | Diaz | 3—1 |

FOREIGN PATENTS

| | | |
|---|---|---|
| 1,180,087 | 10/1964 | Germany. |
| 169,745 | 9/1965 | U.S.S.R. |

OTHER REFERENCES

"Combined Aortic and Mitral Valve Replacement" by Robert S. Cartwright et al., The Journal of Thoracic and Cardiovascular Surgery, vol. 45, No. 1, January 1963, pp. 40–42 relied upon.

"An Inverted Tricuspid Plastic Mitral Valve" by Richard W. Ernst et al., The Journal of Thoracic and Cardiovascular Surgery, vol. 46, No. 6, December 1963, pp. 737–743.

"Comparative Study of Some Prosthetic Valves for Aortic and Mitral Replacement" by C. A. Hufnagel et al., Surgery, vol. 57, No. 1, January 1965, pp. 205–210.

RICHARD A. GAUDET, Primary Examiner

RONALD L. FRINKS, Assistant Examiner

U.S. Cl. X.R.

29—157.1, 453, 469; 137—533.13, 533.19

UNITED STATES PATENT OFFICE
CERTIFICATE OF CORRECTION

PO-1050
(5/69)

Patent No. 3,491,376     Dated January 27, 1970

Inventor(s) Donald P. Shiley

It is certified that error appears in the above-identified patent and that said Letters Patent are hereby corrected as shown below:

Col. 5, line 55, "disance" should be --distance--;
Col. 7, line 66, "atached" should be --attached--;
Col. 11, line 8, "atachment" should be --attachment--;
Col. 11, line 8, "asembly" should be --assembly--;
Col. 11, line 25, "surounding" should be --surrounding--;
Col. 11, line 37, "atachment" should be --attachment--;
Col. 13, line 71, "of" should be --for--;
Col. 14, line 8, "assambly" should be --assembly--;
Col. 14, line 32, "prosphesis" should be --prosthesis--.

SIGNED AND
SEALED

JUN 30 1970

(SEAL)
Attest:

Edward M. Fletcher, Jr.
Attesting Officer

WILLIAM E. SCHUYLER, JR.
Commissioner of Patents